May 15, 1928.

O. B. LINDER 1,669,567

SHOCK ABSORBER FOR VEHICLE SEAT BACKS

Filed March 24, 1927

INVENTOR
Oscar B. Linder
BY
ATTORNEY

Patented May 15, 1928.

1,669,567

UNITED STATES PATENT OFFICE.

OSCAR B. LINDER, OF NEW YORK, N. Y.

SHOCK ABSORBER FOR VEHICLE SEAT BACKS.

Application filed March 24, 1927. Serial No. 178,042.

This invention relates to a new and useful device in the nature of a detachable back rest particularly adapted for use in connection with motor vehicles for the purpose of providing a comfortable support for the backs of passengers riding in motor vehicles, so as not to fatigue the passengers.

The object of the invention is to provide a detachable back rest of novel construction and arrangement of parts, hereinafter more fully described, claimed and illustrated in the accompanying drawing, in which:

Figure 1:
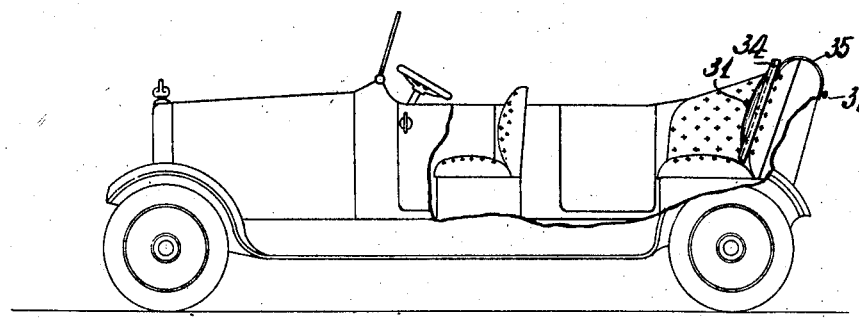
Fig. 1 shows my improved detachable back rest in position on the back cushion of a motor vehicle, as same would appear when in use.
Figure 2:
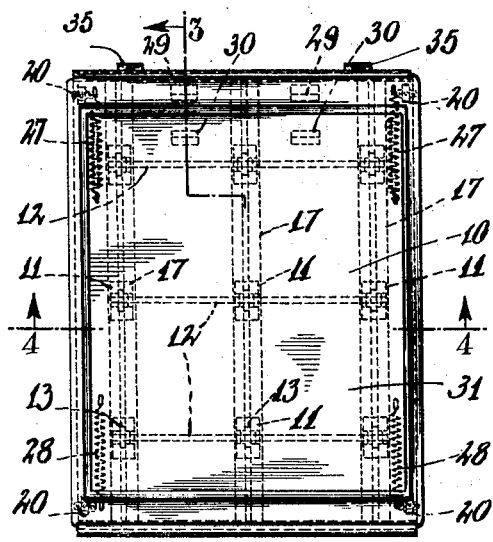
Fig. 2 shows an enlarged top plan view thereof.
Figure 3:
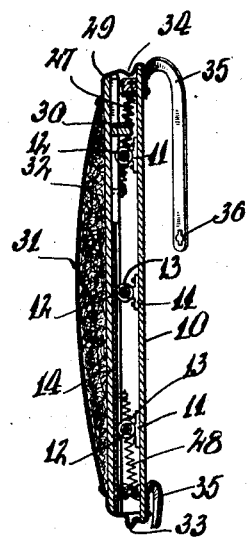
Fig. 3 shows a longitudinal sectional view taken on the line 3—3 of Fig. 2.
Figure 4:
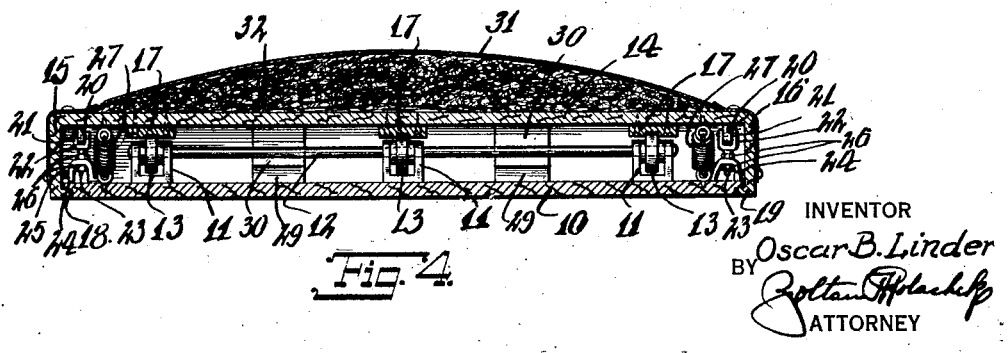
Fig. 4 shows a transverse sectional view taken on the line 4—4 of Fig. 2.

As here embodied my improved device comprises a supporting member 10, of rectangularly shaped construction. The brackets 11 are attached to the supporting member 10, and are provided with apertures, adapted to rotatively support the shafts 12. The rollers 13, are attached to the shaft 12, and are positioned intermediate the extended elements of the brackets 11, so as to hold the rollers 13 in a relatively fixed position. The shafts 12, are extended crosswise or transversely, of the supporting member 10, and are positioned at or near the top and bottom edge, and at the central portion of the supporting member 10.

The back rest proper 14, is of rectangularly shaped construction, and is provided with side portions 15 and 16, extended downwardly therefrom. The guide members 17, are attached to the under side of the back rest proper 14, and are positioned longitudinally thereto. The guide members 17, are provided with longitudinal grooves, adapted to partly receive the above mentioned rollers 13, so as to permit the back rest proper 14, to be slidably mounted on the supporting member 10, in a fixed position relative to the supporting members 10. The side portions 15 and 16 of the back rest proper 14, are provided with extended elements 18 and 19, respectively, adapted to engage in notched portions formed in the sides of the supporting member 10, as a means of further guiding the sliding motion of the back rest proper 14, relative to the supporting member 10.

The roller 20 is rotatively mounted on the pin 21, carried by the yoke member 22. The yoke member 22 is provided with a threaded portion 23, adjustably engaged in a threaded aperture formed in the supporting member 24, attached, as at 25, by bolts, screws, or the like, to the supporting member 10. The threaded members 26, are threadedly attached to the threaded portion 23 of the yoke member 22, and are positioned in the said threaded portion 23, so as to hold the roller 20, in any desired extended position, so as to permit the roller 20, to form contact with the under side of the back rest proper 14. It is understood that a plurality of the above described devices are provided, as a means of supporting the back rest proper, relative to the supporting member 10, so as to permit the back rest proper 14 to be slidably mounted thereon.

The springs 27, are attached to the upper portions of the supporting member 10 and the back rest proper 14, similar springs 28, are attached to the lower portions of the supporting member 10 and the back rest proper 14, the first mentioned springs 27 being somewhat stronger than the springs 28. The latter described construction is such as will permit the springs 27 and 28 to normally hold the back rest proper in a central or intermediate position. The stops 29, are attached to the supporting member 10, and are adapted to engage or strike similar stops 30, attached to the back rest proper 14, as a means of limiting the movement of the back rest proper 14.

The upper side of the back rest proper 14, may be covered with any suitable material 31, such as leather, imitation leather, or similar fabric stuffed with hair 32, moss, or the like. The flexible members 33 and 34, preferably of similar material as the covering material 31, are attached to the lower and upper edges of the back rest proper 14, respectively, and to the lower and upper edges of the supporting member 10. The said flexible members 33 and 34 are provided with a certain amount of looseness or slackness so as to permit of the movement of the back rest proper 14.

Flexible members 35, are attached at the extremities of the upper and lower portions of the supporting member 10, and are provided with apertures 36, formed or cut in their free extremities, adapted to engage fasteners 37, attached to any suitable convenient portion of a motor vehicle, as a means of removably attaching my improved device to the rear seat cushion of a motor vehicle.

Having thus described my invention, what I claim as new and desire to protect by Letters Patent of the United States is as follows:

1. An auxiliary back rest for vehicle seats comprising a base member adapted to be mounted on the back portion of a seat, spaced apart adjustable roller members each comprising a bracket mounted on the forward side of said base member and a yoke adjustably screw threaded in said brackets, a back rest proper slidably mounted on said base member and retained in spaced relation thereto by said adjustable roller members, sides on said back rest proper having extensions slidably engaged in grooves in the rear surface of said base member adapted to frictionally engage the latter for slidably securing said back rest proper on said base member, and springs secured at one extremity to said base member and at the other extremity to said back rest proper for resiliently retaining the latter in a predetermined position.

2. An auxiliary back rest comprising a base member, a back rest proper slidably mounted on said base member, sides on said back rest proper extending rearwardly to the rear surface of said base member, extensions on said sides disposed substantially in the plane of said back rest proper and slidably engaged in grooves in the edges of said base member, and adjustable roller members mounted on said base member and engaging the inner surface of said back rest proper adapted to be extended for suitably positioning said back rest proper in spaced relation to said base member and for varying the frictional engagement between the latter and said extensions.

3. A movable back rest of the class described, comprising a base member, spaced bearings on said base member, a shaft journaled in said bearings, a back rest proper comprising side portions mounted on said base member, extensions on the sides of said back rest proper slidably engaged in slots in the edges of said base member, guide members mounted on the inner surface of said back rest proper having grooves therein, rollers mounted on said rotatively mounted shafts and guided in the grooves of said guide members adapted to retain the front of said back rest proper a predetermined distance from said base member and to maintain a predetermined force of friction between said extensions and the edges of said base member, and adjustable roller members comprising a bracket secured to said base member and a yoke adjustably screw threaded, therein adapted to vary the force the friction between said extensions and the edges of said base member.

In testimony whereof I have affixed my signature.

OSCAR B. LINDER.